(12) United States Patent
Kaiser

(10) Patent No.: US 8,702,167 B2
(45) Date of Patent: Apr. 22, 2014

(54) SEATPOST

(75) Inventor: Michael Kaiser, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 200 days.

(21) Appl. No.: 12/869,023

(22) Filed: Aug. 26, 2010

(65) Prior Publication Data
US 2012/0032414 A1 Feb. 9, 2012

(30) Foreign Application Priority Data

Aug. 5, 2010 (DE) .................... 20 2010 011 100 U

(51) Int. Cl.
B62J 1/00 (2006.01)

(52) U.S. Cl.
USPC .................................. 297/215.13; 297/195.1

(58) Field of Classification Search
USPC .......... 297/198, 203, 215.13, 215.14, 215.15, 297/463.1
See application file for complete search history.

(56) References Cited

U.S. PATENT DOCUMENTS

| 5,138,893 | A | * | 8/1992 | Copeland | 74/551.1 |
| 5,944,932 | A | * | 8/1999 | Klein et al. | 156/245 |
| 6,848,701 | B2 | * | 2/2005 | Sinyard et al. | 280/283 |
| 6,957,856 | B2 | * | 10/2005 | Chiang et al. | 297/195.1 |
| 7,172,180 | B2 | * | 2/2007 | Branca et al. | 267/132 |
| 7,562,932 | B2 | * | 7/2009 | Chiang | 297/195.1 |
| 2007/0222178 | A1 | * | 9/2007 | Davis et al. | 280/281.1 |
| 2007/0232155 | A1 | * | 10/2007 | Frey | 439/783 |
| 2009/0108642 | A1 | * | 4/2009 | Hsu | 297/195.1 |

FOREIGN PATENT DOCUMENTS

| DE | 4404686 | 8/1995 |
| DE | 19701133 | 8/1998 |
| DE | 10144969 | 4/2003 |
| DE | 20310170 | 9/2003 |
| DE | 60306121 | 1/2007 |
| DE | 202006019019 | 4/2007 |
| DE | 60309188 | 8/2007 |
| DE | 202007015382 | 2/2008 |
| DE | 202007016995 | 3/2008 |
| EP | 1476346 | 6/2006 |
| EP | 1864893 | 12/2007 |
| WO | 03066418 | 8/2003 |
| WO | 2004007269 | 1/2004 |

OTHER PUBLICATIONS

European Search Report dated Apr. 11, 2011 for European application No. 11169759.5.
German Search Report dated Apr. 26, 2011 for German application No. 202010011100.5.

* cited by examiner

Primary Examiner — Philip Gabler
(74) Attorney, Agent, or Firm — Ohlandt, Greeley, Ruggiero & Perle, LLP

(57) ABSTRACT

A bicycle frame, particularly a racing bicycle frame, comprises two bars. The bars are connected to a head member for connection to a saddle member. In their frame-side end region, the two bars are formed as a hollow profile. In this region, the two bars have a semicircular cross section so that a common contact face is formed.

27 Claims, 3 Drawing Sheets

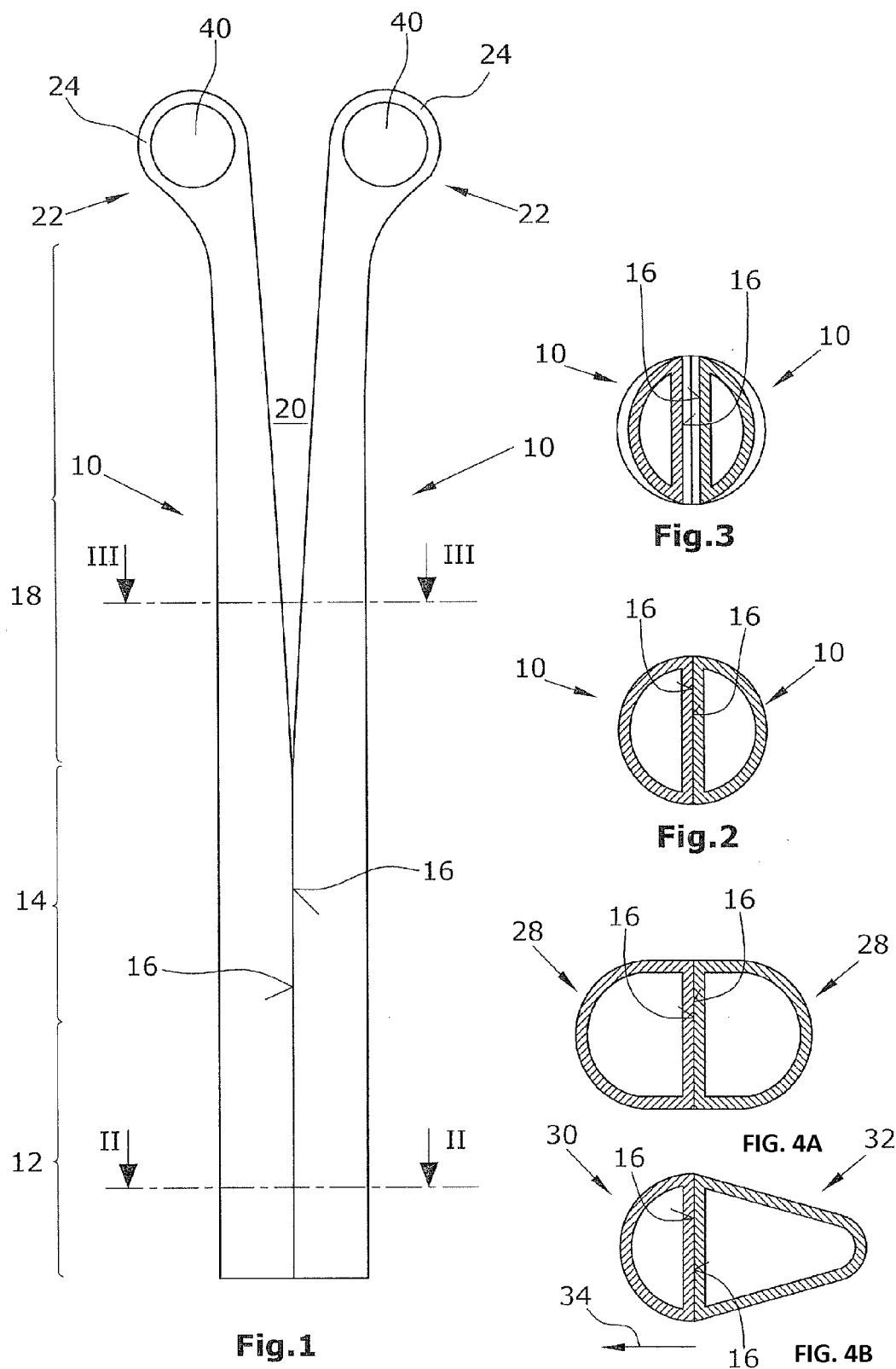

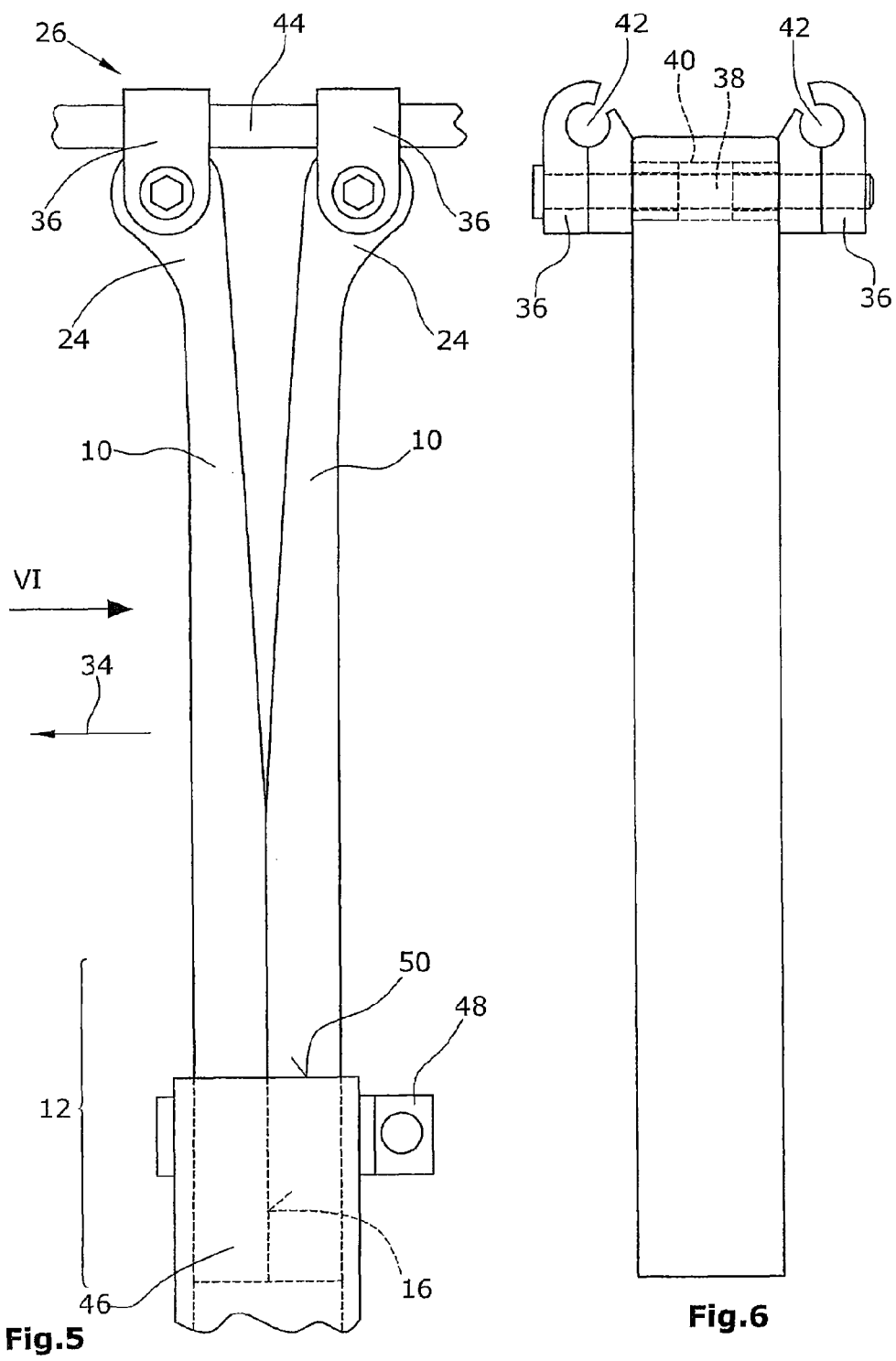

SEATPOST

BACKGROUND

1. Field of the Disclosure

The present invention relates to a seatpost for bicycle saddles, said seat post being particularly suited for trekking or racing bicycles.

2. Discussion of the Background Art

In bicycle riding, already minor unevenness in the road surface will tend to cause considerable physical stress to the cyclist, primarily to his or her spine, back muscles etc. To reduce these stresses, it is known to provide bicycles with rear-wheel suspension systems.

Frame constructions of this type are, however, heavy and overly complex so that the use of such resilient rear-wheel suspension systems is restricted to mountain bikes and trekking bikes. For sports bicycles such as racing bicycles, triathlon bicycles and the like, a provision of resilient rear-wheel suspension systems would be ill-suited already because of the weight of such systems. Further, resilient or dampened seatposts are known. Also these, however, have a heavy weight and thus are not of interest for use in sports bicycles such as racing bicycles.

Known from EP 1 476 346 is a seatpost comprising a head portion for attachment to a saddle member such as a saddle support structure. Connected to said head portion are two bars. These bars, arranged at a distance from each other, are made of a flexible plastic material. In the frame-side end region of said bars, a connection member is provided between the bars, filling the distance between them.

Said connection member is absolutely necessary because the frame-side end region of said bars is inserted into the opening of the seatpost and is clampingly held therein by a seatpost clamp. By the provision of said two flexible bars, the riding comfort is improved. However, the seatpost described in EP 1 476 346 has a low torsional stiffness. Insufficient torsional stiffness will adversely affect the handling of the bicycle.

It is an object of the invention to provide a seatpost for bicycle saddles, particularly for use in racing bicycles, which, while having suitable flexibility for improving the comfort, also has sufficient torsional stiffness.

SUMMARY

The seatpost for bicycle saddles according to the invention, which is particularly suited for racing bicycles, comprises a head member for connection to a saddle member such as, e.g., a saddle support structure supporting the bicycle saddle. Connected to said head member are at least two bars, preferably exactly two bars. In their frame-side end region, the preferably rod-shaped bars are connectible to the saddle tube of the bicycle frame. Preferably, as is the case in conventional seatposts, said connection is realized by inserting the end region of the seatpost into the opening of the saddle tube and particularly by clamping fixation of the seatpost by use of a seatpost clamp. According to the invention, the frame-side end regions of the bars are formed as hollow profiles. Since at least the frame-side end portions are formed as hollow profiles, the bars, which particularly are formed as mutually separate bars along their whole length, have a sufficient torsional stiffness, especially as compared to the seatpost described in EP 1 476 346.

Thus, the inventive design of the seatpost in the form of two bars which particularly are displaceable relative to each other in the longitudinal direction and which in their frame-side end region are formed as hollow profiles, is suited to accomplish an increase of the flexibility of the seatpost in comparison to one-pieced seatposts while, at the same time, a sufficient torsional stiffness is maintained.

According to a particularly preferred embodiment of the invention, said bars are configured to be in abutment with each other in the frame-side end region. Thereby, a contact face is formed between the preferably two bars. Further, it is preferred that the saddle bars have a common cross section corresponding to the cross-sectional opening of the saddle tube. This has the advantage that the end region of the bars can be inserted into the opening of the saddle tube and can be a clampingly fixed, particularly by a seatpost clamp. In this arrangement, it is not required to provide a connection member between the two bars for filing the distance between the bars. Since, according to a preferred embodiment of the invention, the bars are arranged in mutual abutment and have a common cross section which corresponds to the cross-sectional opening of the saddle tube, the seatpost can be mounted in the saddle tube in a simple manner. The common cross section of the seatpost in the frame-side end portion can be circular, as is the case in conventional seatposts. Particularly, the cross section can also have an oval shape or can taper to form an acute angle toward the rear in the riding direction. Such cross sections are provided in aerodynamically optimized bicycle frames.

Because of the contact face between said preferably two bars in the frame-side end region, which contact face according to a preferred embodiment is also provided in the central region of the saddle bars, there is realized a closed shape in spite of the provision of two bars. In this manner, sufficient torsional stiffness is obtained even though the flexibility is improved.

It is particularly preferred that said contact face extends transversely to the longitudinal direction of the frame, particularly across the whole width of the seatpost. Thus, in case of a circular cross section of the seatpost in the frame-side end region, it is preferred that the two bars have a substantially semicircular cross section. Correspondingly, in case of an oval cross section, the bars each have a semi-oval cross section. In case of a cross section tapering opposite to the riding direction, a first bar, arranged at the front, can have a semicircular cross section, and a second bar, arranged at the rear, can have a substantially triangular cross section, with the apex of the triangle facing opposite to the riding direction.

According to a preferred embodiment, one or a plurality of contact faces between said preferably two bars are convexly curved. According to the preferred embodiment wherein exactly two bars are provided, the two inner, mutually confronting faces which form the contact face are thus convexly curved toward each other. As a consequence, once the two faces contact each other, there will first occur just a line-shaped contact. When, however, the two bars are then pressed toward each other in the region of the clamping attachment within the saddle tube, there preferably occurs a deformation of the inner walls of the hollow profiles so that said line-shaped contact is transformed into an areal contact. Due to the resultant elastic deformation of the inner wall of the hollow profiles, a bias is generated. Thereby, the press-on force between the two surface forming the contact faces is increased, resulting in an increased clamping force and an enhanced fixation of the inventive seatpost in the saddle tube of the bicycle frame.

According to a particularly preferred embodiment, said curve is not provided to extend over the whole contact face in the longitudinal direction. Instead, preferably, the inner sides—forming said contact faces—of the bars, are of a flat shape in the lower frame-side end region. This pertains to the lower region which will be the first region to be inserted into the saddle tube of the frame, wherein the flat configuration of the inner faces preferably extends along 10 to 13 mm. This has the considerable advantage that the particularly two bars do not have to be pressed together for effecting a deformation of the inner walls already when inserting the saddle bars into the opening of the saddle tube.

Preferably, said bars have the same cross section both in the end region and in the central region, i.e. along substantially the lower two thirds of the total length of the seatpost. Particularly, the bars are formed as hollow profiles both in the end region and in the central region, it being particularly preferred that the bars are formed as hollow profiles along their whole length, i.e. all the way to the saddle-side end where the connection to said head member is provided. Preferably, the cross section of the bars is adapted as well as possible to the distribution of the bending moments. This allows for a homogenization of the stress occurring in the component.

Since, according to a preferred embodiment, the flexibility of said bars shall increase starting from the frame-side end, it is provided, according to a preferred embodiment, that the saddle-side end region of at least one bar and preferably of all bars is formed to have a decreasing cross-section or cross-sectional area. The decrease of the cross section is preferably free of steps and particularly is continuous. In the particularly preferred embodiment wherein exactly two bars are provided, these are preferably of identical design.

Preferably, a reduction of the cross sections is realized in that said bars have a width transversely to the longitudinal direction of the frame that is substantially constant along the whole length of the bars. Thus, said reduction of the cross section in the saddle-side end region preferably is effected exclusively by reducing the width of the bar in the longitudinal direction of the frame. Thereby, in turn, the flexibility in the saddle-side end region is increased so that the torsional stiffness will be maintained or at least a desired residual stiffness will remain.

Preferably, due to the tapering shape of said bars, a slot is provided in the saddle-side end region between the preferably two bars. Said slot is preferably widening in the direction of the head member so that, when seen in lateral view, a preferably V-shaped slot is formed. Thus, the contact faces between the preferably two bars which preferably extend transversely to the longitudinal direction of the frame, are thus in mutual abutment in the frame-side end region as well as in the central region of the seatpost and are then guided away from each other, thus generating a slot.

According to a particularly preferred embodiment, said bars are designed in such a manner that the largest possible uniformity of the stress acting on the bars can be realized from the saddle-side end to the frame-side end of the bars. This is rendered possible particularly by a continuous change of the cross section in the saddle-side end region. The distribution of the bending stresses can further be influenced by the selection of materials and the variation of the wall thickness.

According to a particularly preferred embodiment, said bars have a varying wall thickness, and/or use is made of different materials and/or orientations of the fibers so as to accomplish a still higher uniformity of the stress acting on the fibers.

In this regard, it is particularly preferred that the wall thickness in the frame-side end region of said bars increases in the direction of the central region. With particular preference, the wall thickness increases continuously from about 1 mm to about 2 mm. This increase is preferably realized along a length of 50 to 70 mm. Further, it is preferred that the wall thickness in the central region decreases in the direction of the saddle-support side end region. Preferably, in this regard, said decrease is from about 2 mm to about 1 mm along a length of 100 to 140 mm following the frame-side end region. Further, it is preferred that the wall thickness of the hollow profile is constant in the saddle-support side end region.

At least in partial regions, the contact face between the preferably two bars is formed or treated to present a surface adapted to increase the friction value. Thereby, displacement of the bars in the longitudinal direction, which is not desired or is desired only within very narrow limits, can be reduced. An increase of the frictional value of the surface of the contact faces can be effected by roughening or by coating. Also, surface friction elements of hard materials can be installed. Further, an intermediate element, can be provided between the bars for increasing the friction, said intermediate element abutting the contact faces. The intermediate element can be a thin plate with suitably rough surfaces.

Said bars of the seatpost are preferably made of reinforced composite fiber material. In this case, the fibers preferably extend in the longitudinal direction of the bars. By suitable selection of the fibers or, optionally, by a combination of different fiber types and/or fiber thicknesses, the stresses acting on the fibers can be rendered more uniform due to the distribution of the bending moments.

Said bars, which preferably are formed as a hollow profile along their whole length, can at least partially be filled with a material of lower density. Thereby, in dependence on the occurring distribution of bending moments, the stress acting on the bars can be made still more uniform. In comparison to the material which the bars themselves are made of, said filling material has a lower density. The latter material can be provided in the form of foamed plastic material, honeycomb structures and the like.

By varying the design of said bars, e.g. with regard to the selection and arrangement of the fibers, the selection of the wall thickness, and the selection and arrangement of a filling in the interior of the hollow profile, it is rendered possible to realize different degrees of resilience, i.e. different degrees of suspension comfort. Thereby, it is possible to offer different seatposts for different fields of usage according to the preferences of the cyclist, and a variation of the weight of the cyclist, etc.

The connection of said bars to the head member is preferably realized in that at least one bar is formed with a thickened portion on the saddle-side end. In the preferred embodiment wherein two bars are provided, both bars comprise a thickened portion. The thickened portion serves for receiving preferably respectively one head portion of the head member. It is preferred that the thickened portion extends, starting from a central plane of the seatpost, toward the front and respectively toward the rear.

Thus, the inner region between said preferably two bars, in which according to the preferred embodiment said slot is provided, is entirely planar. According to a particularly preferred embodiment, said thickened portion is formed in one piece with the bar and thus is preferably made of composite fiber material.

Preferably, said thickened portion is formed with an opening extending transversely to the longitudinal direction of the frame and serving to receive a pivot axis. The pivot axis preferably is freely pivotable within said opening. Thus, via said pivot axis, no moments or at the most only small moments can be transmitted to the bar. This has the advantage that the thickened portion and thus the saddle-side end region of the bars will not be subjected to excessively high moments; as a result, the safety-relevant strength and stability can be realized also in case of a thin and thus light-weighted design of the bars. In the preferred embodiment of the seatpost with two bars, there are thus provided two pivot axes, preferably extending parallel to each other.

Said head members preferably are provided with fixing elements for connection to a saddle member such as e.g. a tubular saddle support. Via said fixing elements, the saddle support to be attached is held in place preferably by clamping attachment. Preferably, two fixing elements are provided per head member. The fixing elements are preferably connected exclusively to said pivot axis and are arranged respectively laterally to said thickened portions.

The invention further relates to a bicycle frame, particularly a racing bicycle frame. The inventive bicycle frame comprises, in the usual manner, a top tube, a down tube and a saddle tube. The down tube and the saddle tube can be connected e.g. to a bottom bracket. The connection between the down tube and the top tube is realized in the usual manner via a steertube for receiving the fork.

According to this embodiment of the invention, the saddle tube merges into a seatpost, thus obviating the need for clamping fixation of the seatpost via a seatpost clamp. Bicycle frames of this type are known especially in extremely light-weighted racing bicycles. According to the invention, the seatpost again comprises at least two bars.

Said bars are connected to a head member for connection to a saddle member such as, e.g., a saddle support. In their frame-side end region, i.e. in the transition region between the saddle tube and the bars, the bars are formed as hollow profiles. Preferably, also these bars of the seatpost which form one piece with the saddle tube, are formed in the manner described above.

In this arrangement, the saddle height can be adapted in that the saddle bars are shortened and then are connected to a head member. In so far, it is preferred, in this one-pieced embodiment of the invention, that the bars are formed in the above described manner along their whole length, so that the stress acting on the bars will be as constant as possible. In the one-pieced embodiment, it is not absolutely required that the bars have a constant outer cross section along a lower end region, particularly the frame-side end region, and along a central region, because the one-pieced seatpost cannot be varied in height by displacement in the saddle tube.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which FIG. 1 is a schematic lateral view of the seatpost of the invention without head member, FIG. 2 is a schematic sectional view of the frame-side end region of the bars, as seen along the line II-II, FIG. 3 is a schematic sectional view of the saddle-side end region of the bars, as seen along the line III-III, FIGS. 4A and 4B are views of alternative cross-sectional shapes to the cross-sectional shape depicted in FIG. 2, FIG. 5 is a schematic lateral view of the seatpost in the mounted state, FIG. 6 is a schematic front view of the seatpost as seen in the direction of arrow VI in FIG. 5, in the unmounted state.

DETAILED DESCRIPTION OF PREFERRED EMBODIMENTS

Figure 7:
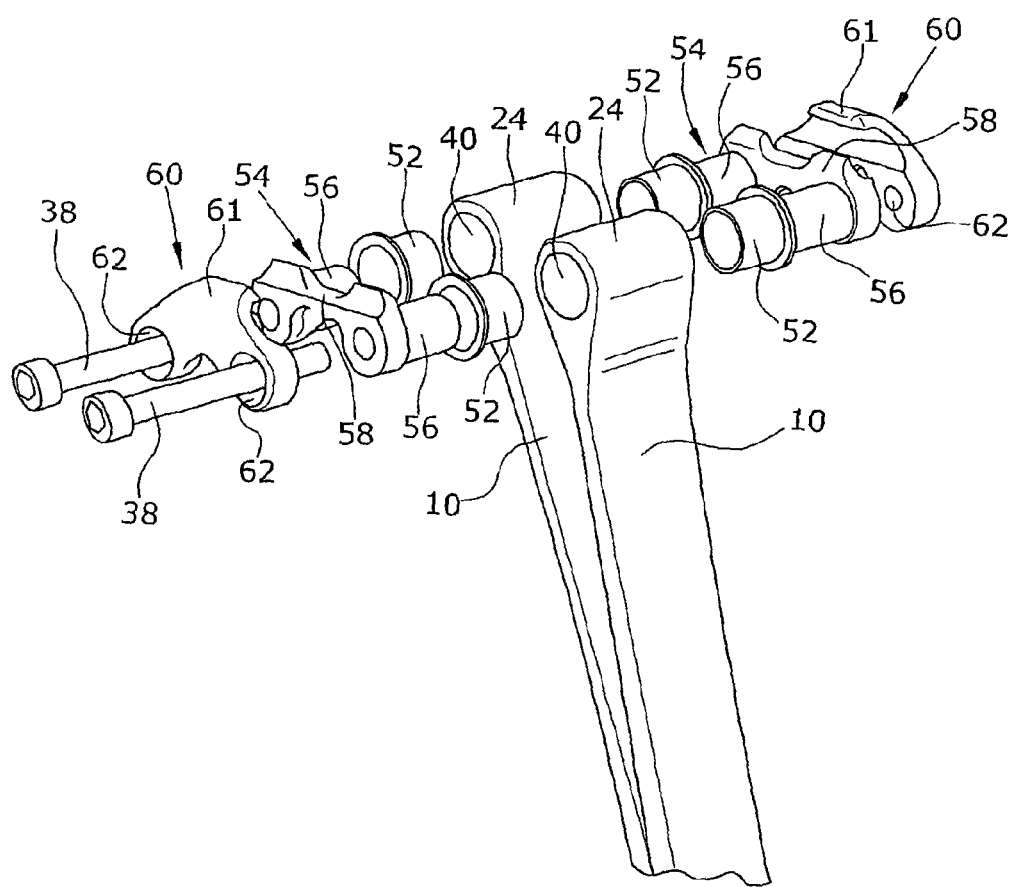
FIG. 7 is a schematic perspective exploded view of the saddle-side end region of the seatpost, comprising a further preferred embodiment of the head member.

The seatpost of the invention shown in FIG. 1 comprises two bars 10 which preferably are formed as hollow profiles along their entire length. Particularly in one end region 12 which is about the lower third of said bars 10, the bars are formed as hollow profiles. In the illustrated embodiment, the bars 10 are two identically formed bars which in their frame-side end region 12 have a semicircular cross section (FIG. 2). In their frame-side end region 12 and preferably along their whole length, the bars 10 have a constant wall thickness. In the frame-side end region 12 as well as in a central region 14, the cross section of the bars 10 preferably remains the same, as depicted in FIG. 2. In the frame-side end region 12 and, in the illustrated embodiment, also in a central region 14, there is thus formed a contact face 16 between the two bars, which contact face comprises the mutually confronting inner sides of the semi-annular bars 10 (FIG. 2). According to a preferred embodiment, said two inner sides forming said contact face 16 are convex, i.e. they are bulging toward each other so that the bars, in the state when they are not clamped into the saddle tube, are in line-shaped contact with each other.

Preferably, in the lower region in FIG. 1, there is realized an areal contact so as to facilitate the insertion of the seatpost into the saddle tube.

In a saddle-side end region 18 of the two bars 10, the bars have a tapering cross section (FIG. 3). Thus, the two inner sides 16 do not form a contact surface anymore. Instead, when seen in lateral view, a slot 20 is formed between the two bars 10, which is V-shaped in lateral view (FIG. 1).

In the illustrated embodiment, those ends 22 of the bars 10 which follow the saddle-side end region 18 are each formed in one piece with the bars and comprise a thickened portion 24 serving for connection to head member 26 (FIG. 5).

By way of alternative to the configurations of the cross sections of the two bars 10 depicted in FIG. 2, the cross sections can also be provided in the manner shown in FIGS. 4A and 4B. Thus, the overall cross section can e.g. have an oval shape, thus forming two preferably identical bars 28 as in FIG. 4A.

These bars preferably again have a constant wall thickness and comprise a contact face 16. In the central and particularly the upper region 18, preferably both saddle bars 28 are tapering as described with reference to FIG. 1.

Particularly also in aerodynamically designed seatposts, two bars can be provided which can be designed as exemplified by the bars 30,32 in FIG. 4B. In this arrangement, bar 30 is formed as a semicircular bar corresponding to bar 10 and again has a constant wall thickness. The rear bar 32 relative to the riding direction 34 has a substantially triangular cross section, with the apex of the triangle pointing in the direction opposite to the riding direction 34.

Preferably, both bars 30,32 again have a constant wall thickness. Also these bars are preferably formed with a taper in the upward direction, particularly in the saddle-side end region.

For reasons of production technology, the individual bars should always have rounded corners.

In the illustrated embodiment, for connecting the inventive seatpost to a saddle, the head member 26 (FIG. 5) comprises a total of four head portions 36. By means of a pivot axis 38 which in the illustrated embodiment is substantially formed as a screw, the head portions 36 are connected to the respective thickened portion 24 of bar 10. For this purpose, the thickened portion 24 comprises a respective opening 40 through which said pivot axis 38 is fitted. The four head portions 36 further comprise a respective part-circular opening 42. This opening serves for taking up and for clamping fixation of a tubular element 44 of the saddle support. For clamping fixation of said tube element 44 by reduction of the cross section 42 of the opening, the head portions 36 can be e.g. of a two-part configuration.

For increasing the stiffness, two head portions 36 arranged behind each other in the longitudinal direction 34 of the frame (FIG. 5) can also be connected to each other by a bridge-like element, or they can be formed in one piece.

By the provision of the head portions 36 in combination with the two mutually parallel pivot axes 38, two joints are realized. Since each of the two pivot axes 38 allows for pivoting movement of one of the two bars 10 thereabout, it is rendered possible to displace the bars 10 relative to each other in the longitudinal direction. Such a displacement will result in a change of the inclination of the saddle. Thus, by displacing the bars 10 relative to each other in the longitudinal direction, the inclination of the saddle can be adjusted in a convenient manner.

Since, consequently, within the head portions 36, the saddle support 44 has to be displaced only in the longitudinal direction, the head member 26 can be given a simple and light-weighted design in comparison to conventional head members.

Fixation of the seatpost in a saddle tube 46 (FIG. 5) is performed, as is the usual practice also in conventional seatpost, by means of a saddle clamp 48. For this purpose, at least a part of the frame-side end region 12 of the two bars 10 will be inserted into an opening 50 of saddle tube 46, while the opening 50 will be reduced in cross section with the aid of saddle clamp 48 for clamping fixation of the two bars 10.

According to a further, independent embodiment of the invention, it can be provided, for particular application in lightweight racing bicycles, that the bars 10 are connected to saddle tube 46 by a one-pieced connection. Also in this embodiment, different cross sections can be realized, as shown e.g. in FIG. 4.

A further preferred embodiment of the head member is shown in the exploded view of FIG. 7, wherein similar or identical component parts are marked by the same reference numerals.

Each of the thickened portions 24 is provided with a bore 40. First, in the illustrated embodiment, a respective sleeve 52 will be inserted into the bore 40 from each side. Into two sleeves 52 arranged on a side of the seatpost, a respective first head member 54 will be inserted. The head members 54 comprise cylindrical projections 56 for insertion into the shells 52. The two cylindrical projections 56 are connected to each other via a bridge-like member 58, the latter defining a part of the opening 42 (FIG. 6) for receiving the saddle support 44.

Said opening 42 will then be formed by a second head member 60 which again is bridge-shaped and comprises a projection 61 extending between two opposite projections of said first bridge member 54. The second head member 60 further comprises two openings 62 for insertion of pivot axes 38 formed as screws. In this arrangement, it is preferred that the right-hand (second) head member 60 in FIG. 2 is provided with threads in the corresponding openings 62. In the assembled state, the head member depicted in FIG. 7 substantially corresponds to the head members 26 shown in FIGS. 5 and 6, particularly under the functional aspect.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A seatpost for bicycle saddles, comprising:
a head member for connection to a saddle member, and
at least two bars connected to said head member, each bar of the at least two bars having a frame-side end region, a central region, and a saddle-side end region, the frame-side end region of said bars-being adapted to be fixed in a saddle tube of a bike frame, wherein
the frame-side end regions of said bars are formed as a hollow profiles,
the at least two bars each having a contact face, the contact faces abutting one another at the frame-side end regions but being spaced from one another at the head member, and
the at least two bars having a cross-section that is free from steps and continuously decreases from said frame-side end region to the saddle-side end region.

2. The seatpost according to claim 1, wherein said bars have a cross-section, where abutted, that corresponds to a cross-sectional opening of said saddle tube.

3. The seatpost according to claim 1, wherein exactly two bars are provided, said bars being arranged in mutual abutment on a contact face extending transversely to the longitudinal direction of the bike frame and along the whole width of the bars.

4. The seatpost according to claim 3, wherein, in a region of said contact face, said bars are bulged in a convex shape.

5. The seatpost according to claim 4, wherein, in a partial region, said contact face is flat.

6. The seatpost according to claim 1, wherein said bars in their frame-side end region and in their central region substantially have the same cross-section.

7. The seatpost according to claim 1, wherein said hollow profiles are at least partially filled with materials of lower density.

8. The seatpost according to claim 7, wherein said materials of lower density are at least one selected from the group consisting of: foamed plastic material and honeycomb structures.

9. The seatpost according to claim 1, wherein the width of at least one bar transversely to the longitudinal direction of the bike frame is substantially constant along the whole length of the bar.

10. The seatpost according to claim 1, wherein, in the saddle-side end region, a slot is provided between bars.

11. The seatpost according to claim 1, wherein said contact face between the bars at least in partial regions has a surface adapted to increase a friction value.

12. The seatpost according to claim 1, wherein said bars are made of reinforced composite fiber material having fibers extending in a longitudinal direction of the bars.

13. The seatpost according to claim 1, wherein said bars in regions where they are formed as hollow profiles, have a wall thickness which in said frame-side end region increases, constantly, in the direction of said central region.

14. The seatpost according to claim 1, wherein at least one bar on its saddle-side end region comprises a thickened portion for connection to a head portion of said head member.

15. The seatpost according to claim 14, wherein said thickened portion comprises an opening extending transversely to a longitudinal direction of the bike frame and provided to receive a pivot axis.

16. The seatpost according to claim 15, wherein, for connection to the saddle member, the head portion comprises two fixing elements arranged laterally of the bar.

17. The seatpost according to claim 16, wherein said fixing elements are connected exclusively to said pivot axis.

18. The seatpost according to claim 1, wherein said bars in their frame-side end region and in their central region are formed as a continuous hollow profile.

19. The seatpost according to claim 1, wherein said bars are formed as hollow profiles in said central region and have a wall thickness which in said central region that decreases, constantly, in the direction of said saddle-side end region.

20. The seatpost according to claim 1, wherein said hollow profiles have a wall thickness which is constant in said saddle-side end region.

21. The seatpost according to claim 1, wherein the contact faces are spaced from one another at the saddle-side end region.

22. The seatpost according to claim 1, wherein the contact faces abut one another only at the frame-side end regions and a part of the central regions adjacent to the frame-side end regions, but are spaced from one another at a remainder of the central region and at the saddle-side end region.

23. A bicycle frame, comprising:
a saddle tube; and
a seatpost having a frame-side end region, a central region, and a saddle-side end region, the seatpost comprising at least two bars extending from the frame-side end region to the central region and from the central region to the saddle-side end region, the frame-side end region being received in the saddle tube and the saddle-side end region having a head configured to connect to a saddle member, said two bars being formed as a hollow profile in said frame-side end region, said central region, and at least part of said saddle-side end region,
the at least two bars abutting one another at the frame-side end regions but being spaced from one another at the saddle member,
the at least two bars each having a width transverse to a longitudinal direction of the frame that is constant from said frame-side end region to the saddle-side end region and a cross-section that continuously decreases from said frame-side end region to the saddle-side end region.

24. The bicycle frame according to claim 23, wherein said two bars have a cross-section, where abutted, that corresponds to a cross-sectional opening of said saddle tube.

25. The seatpost according to claim 23, wherein the at least two bars are spaced from one another at the saddle-side end region.

26. The seatpost according to claim 23, wherein the at least two bars abut one another only at the frame-side end regions and a part of the central regions adjacent to the frame-side end regions, but are spaced from one another at a remainder of the central region and at the saddle-side end region.

27. A bicycle frame, comprising:
a saddle tube;
a saddle support tubular element;
a first seatpost bar having a frame-side end region, a central region, and a saddle-side end region; and
a second seatpost bar having a frame-side end region, a central region, and a saddle-side end region, the first and second seatpost bars having a cross-section that is free from steps and continuously decreases from said frame-side end region to the saddle-side end region, wherein the frame-side end region of the first and second seatpost bars abut one another so as to be received in the saddle tube, but the saddle-side end region of the first and second seatpost bars diverge from one another so as to connect to spaced apart regions of the saddle support tubular element.

* * * * *